D. R. WAY.
CORN HARVESTER.
APPLICATION FILED OCT. 9, 1913.
1,131,022.
Patented Mar. 9, 1915.
4 SHEETS—SHEET 1.
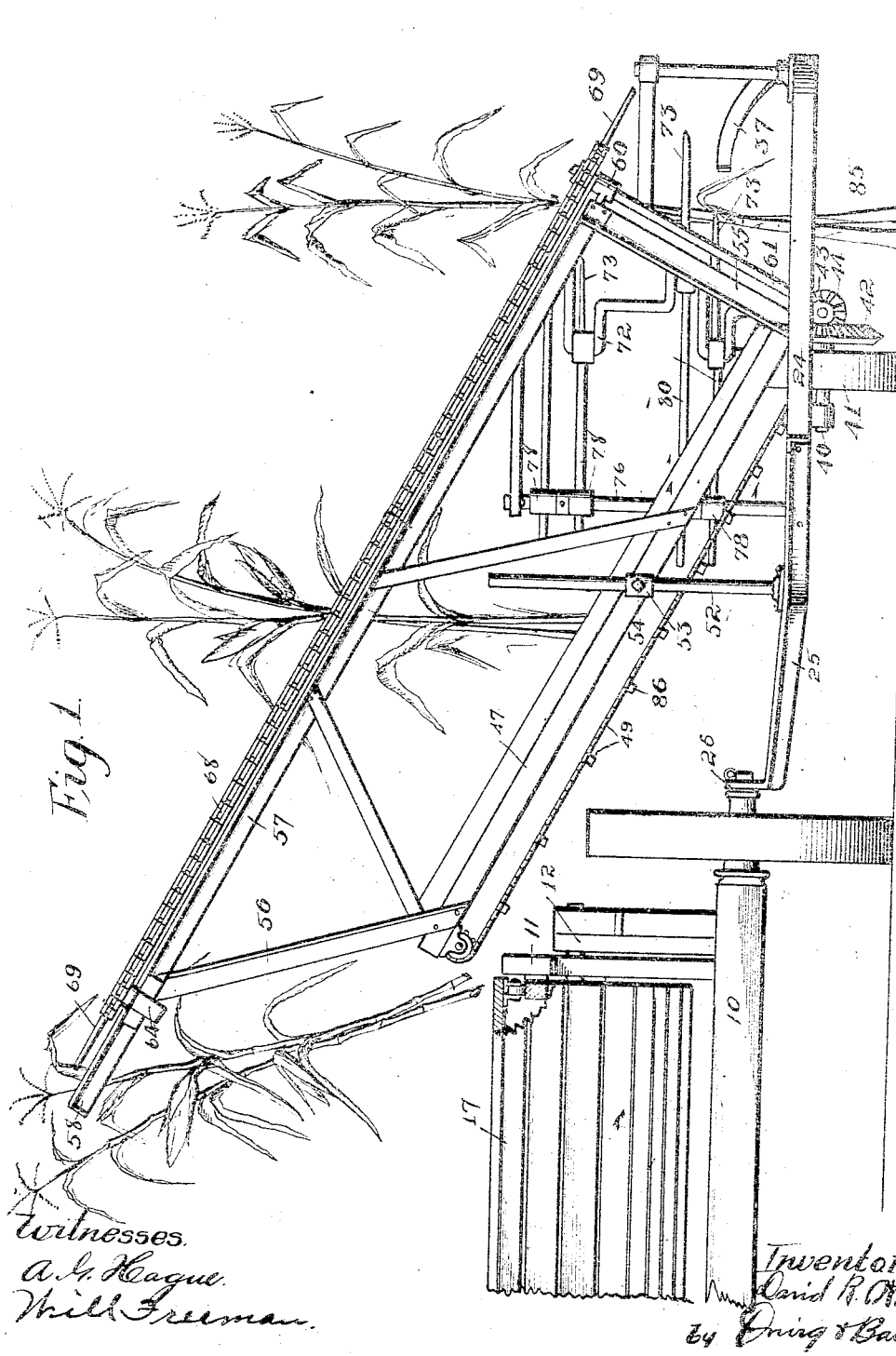

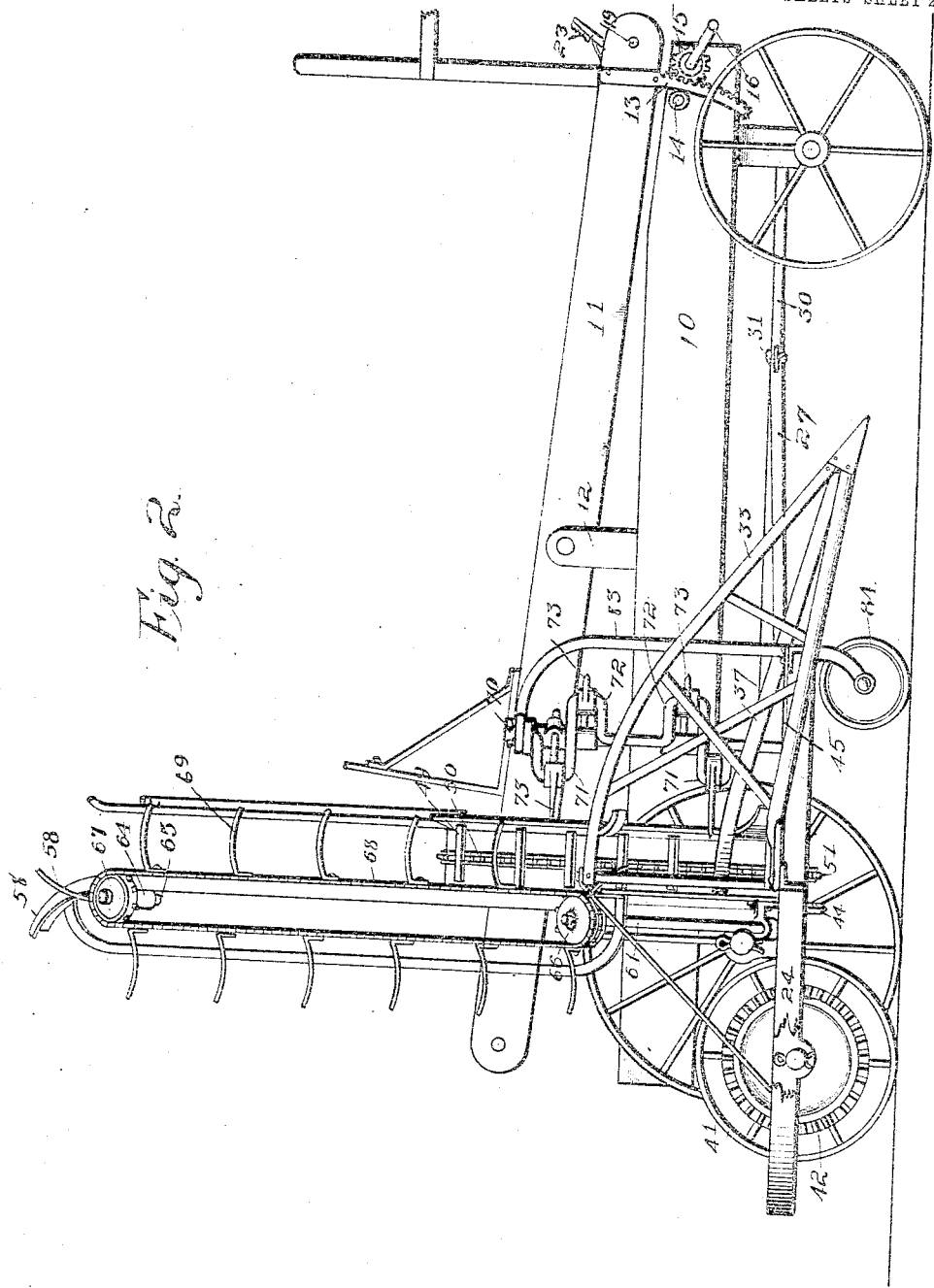

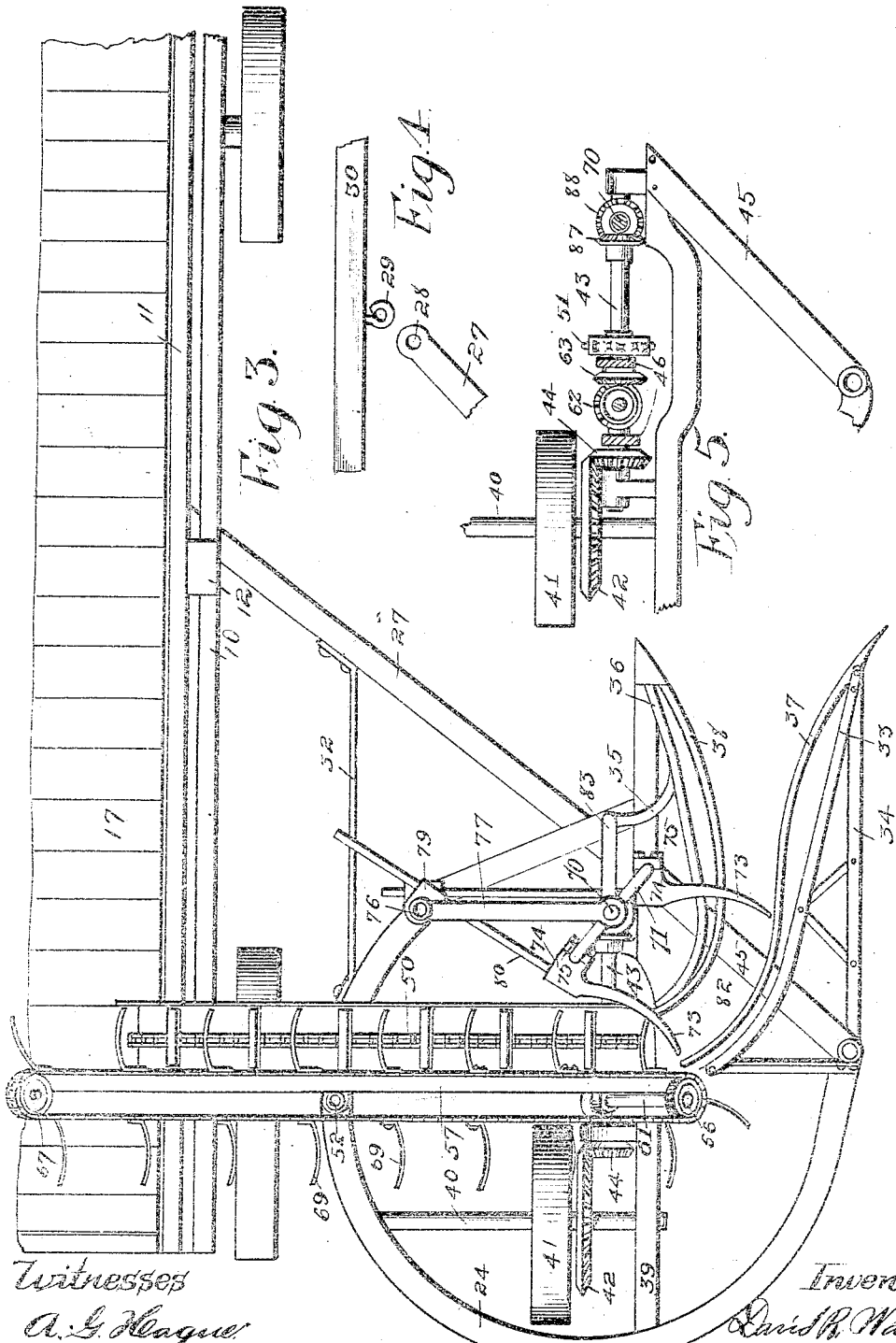

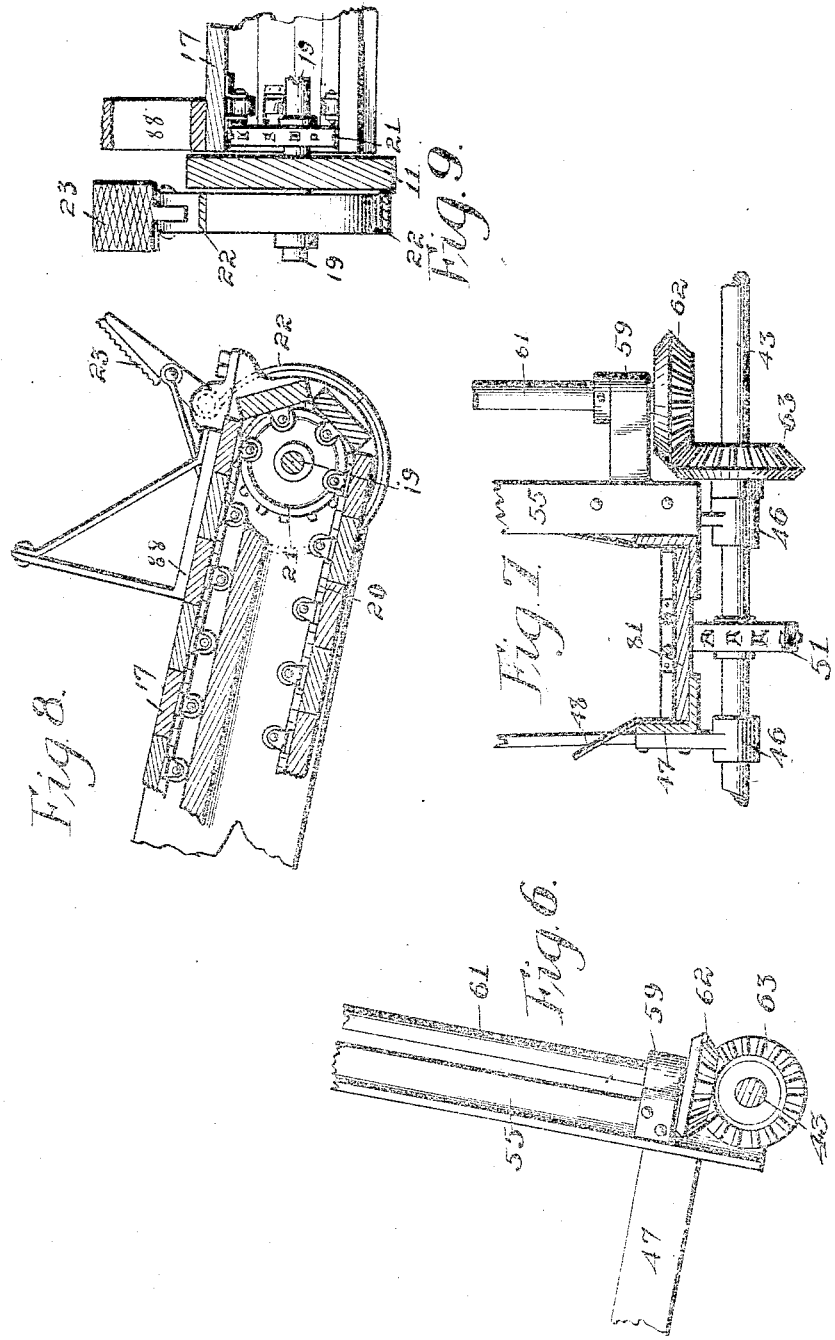

UNITED STATES PATENT OFFICE.

DAVID R. WAY, OF FAIRFIELD, IOWA, ASSIGNOR OF ONE-HALF TO EDWIN M. KRUM, OF FAIRFIELD, IOWA, AND IRA D. WAY AND EVERET BERRY, OF CHICAGO, ILLINOIS.

CORN-HARVESTER.

1,131,022.  Specification of Letters Patent.  Patented Mar. 9, 1915.

Application filed October 9, 1913. Serial No. 794,347.

*To all whom it may concern:*

Be it known that I, DAVID R. WAY, a citizen of the United States, residing at Fairfield, in the county of Jefferson and State of Iowa, have invented a certain new and useful Corn-Harvester, of which the following is a specification.

The object of my invention is to provide a corn harvester of simple, durable and inexpensive construction.

A further object is to provide a corn harvester of comparatively light weight which may be readily and easily attached to an ordinary farm wagon or detached therefrom.

Still a further object is to provide a corn harvester so constructed and arranged as to cut the corn in the row, elevate the same and drop it across a wagon or across a traveling conveyer on a wagon so that the corn will be arranged in transverse layers or rows convenient for being carried along on a conveyer or for being loaded by a man on the wagon.

A further object is to provide a corn harvester designed to be attached to a wagon and provided with a traction wheel and gearing mechanism whereby the harvester is operated from the traction wheel.

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a rear elevation of a corn harvester embodying my invention attached to a wagon on which is mounted a gravity traveling conveyer. Fig. 2 shows a side elevation of the corn harvester and wagon. Fig. 3 shows a top or plan view of the corn harvester and a portion of the wagon. Fig. 4 shows a detail, sectional view showing the manner in which the front portion of the harvester is secured to the wagon reach. Fig. 5 shows a detail view, partly in section, of the gearing mechanism of my improved corn harvester. Fig. 6 shows a detail view of a part of the gearing mechanism. Fig. 7 shows a detail view, partly in section, of a part of the gearing mechanism and the elevator conveyer. Fig. 8 shows a longitudinal, sectional view through a portion of the gravity conveyer on the wagon, and Fig. 9 shows a transverse, sectional, detail view of a portion of the conveyer on the wagon.

In the accompanying drawings, I have used the reference numeral 10 to indicate generally the frame of a wagon. On the wagon 10 is mounted a gravity traveling conveyer 11 which is centrally pivoted upon brackets 12 slightly above the wagon bed. At one end, preferably the forward end, of the conveyer 11, there is mounted thereon a rack bar 13 curved on the arc of a circle having its center at the pivotal point of the conveyer 11.

Mounted on the wagon 10 is a guide roller 14. A pinion 15 meshes with the teeth of the rack bar 13 and is operated by means of a crank handle 16. The conveyer 11 includes a traveling platform conveyer 17 of suitable construction having the sprocket chains 20 which travel on sprocket wheels 21 on the shafts 19. For controlling the movement of the traveling conveyer 17, I have mounted at the forward end of the conveyer, a band brake 22 controlled by a foot lever 23.

My improved corn harvester comprises a curved frame 24. Secured to one side of the curved frame 24 is a laterally extending frame member 25 designed to be secured to the axle of a wagon at 26 in any suitable manner. As will be seen, the harvester is designed to be placed at the side of a wagon and attached to the rear axle.

Extending forwardly and toward the wagon from the central forward portion of the frame of the harvester is a brace or frame member 27 having in one end an opening 28 through which a bolt 31 may be extended to secure the member 27 to an eye-bolt 29 on the wagon reach 30. The frame member 27 is further connected with the frame 24 by a cross brace 32.

Suitably mounted on the forward outer end of the frame of the harvester are gathering arms 33 and 36 carried by frame members 34 and 35. Secured to the forward ends of the gathering arms 33 and 36, and extending rearwardly and then inwardly therefrom, are springs 37 and 38 designed to hold the stalks of corn between them. Extending forwardly from the rear portion of the curved frame 24 is a longitudinal frame member 39.

Suitably mounted on the frame members of the harvester is a transverse shaft 40 on which is mounted a traction wheel 41. The shaft 40 is rotatably mounted on the frame. Fixed on the shaft 40 is a beveled gear 42. Mounted on the frame of the harvester is a shaft 43 arranged at right angles to the shaft 40. On the shaft 43 is a smaller beveled gear 44 in mesh with the gear 42.

Suitably mounted on the frame below the gathering arms 33 and 36 is a knife 45. On the shaft 43 are mounted bearings 46 to which is secured a conveyer frame 47 extending upwardly and toward the wagon from the shaft 46. The conveyer frame 47 is provided with upwardly and outwardly extending side-boards or wings 48. Suitably mounted on the conveyer frame 47 is a slat conveyer 49 provided with a sprocket chain 50 which travels over a sprocket wheel 51 mounted on the shaft 43.

Mounted on the frame member 25 is an upright support 52. Slidably mounted on the support 52 is a collar 53 to which the frame 47 is secured. The collar 53 may be adjusted on the support 52 by means of a set screw 54 for raising or lowering the conveyer frame 47.

Secured to and extending upwardly from the frame 47 are frame members 55 and 56 preferably of angle iron. The frame 56 is inclined upwardly and away from the frame 47 so that its upper end may extend over the wagon. Connecting the upper ends of the frame members 55 and 56 is a frame member 57 which, as will be seen, inclines from its lower end upwardly and to a point above the wagon. The frame member 57 is preferably extended beyond the frame member 56 and curved rearwardly at 58. Secured to the frame member 55 near the upper and lower ends thereof are suitable bearings 59 and 60 in which is mounted a shaft 61. On the lower end of the shaft 61 is a beveled gear 62 in mesh with the beveled gear 63 on the shaft 43.

Mounted on the frame member 57 near its upper end is a bearing 64 in which is rotatably mounted a short shaft 65. On the upper ends of the shafts 61 and 65 are sprockets 66 and 67 on which travel a sprocket chain 68. Secured to the sprocket chain 68 are a plurality of outwardly extending curved fingers 69.

Rotatably mounted on the frame of the harvester, near the forward end of the shaft 43, is an upright shaft 70 having formed thereon four cranks 71 and 72. The cranks 71 and 72 are preferably arranged so that the cranks 71 extend away from the shaft 70 in one direction while the cranks 72 extend away from said shaft in the opposite direction. Rotatably mounted on the respective cranks 71 and 72 are gathering fingers 73 having two part bearings, parts of which are indicated by the reference numerals 74 and 75.

Mounted on the frame of the harvester is an upright member 76 which may be a rod or pipe, and is located between the shaft 70 and the wagon 10 on a line extending transversely across the harvester from the shaft 70. The upper ends of the shaft 70 and the upright 76 are connected by a transverse brace member 77. Rotatably but non-slidably mounted on the upright member 75 are collars 78 having lugs 79 formed thereon. Fixed to each of the gathering fingers 73, preferably to the bearing member 74 thereof, is a rod 80, the inner end of which is slidably mounted in one of the lugs 79.

The conveyer frame 47 is provided with a floor 81. Mounted just below the rear portion of the knife 45, extending rearwardly to a point adjacent to the lower end of the frame 47, is a platform 82. Secured to the upper end of the shaft 70 and extending forwardly and downwardly therefrom, and suitably braced on the harvester frame is a frame member 83 which, at its lower end carries a caster wheel 84.

I shall now describe the practical operation of my improved corn harvester: The harvester frame is secured to the wagon by attaching the frame members 25 and 27 to the rear wagon axle and to the reach. The harvester is then ready for use. The wagon 10 is drawn forward by any motive power so that the gathering arms 33 and 36 approximately follow a row of corn 85. The corn stalks are cut by the knife 45. The shaft 70 is so geared that the gathering fingers 73 travel fast enough so that when the corn is cut by the knife 45 and is held between the springs 37 and 38 it is engaged by the fingers 73 and its upper end is tipped rearwardly and toward the frame member 57. The upper portion of the stalks will then drop over, leaning against the fingers 69 and the lower ends will be engaged by the slats 86 on the slat conveyer 49, and will be moved upwardly on the floor 81.

It will readily be seen that when the wheel 41 is drawn forwardly, thereby rotating the shaft 40 and the gear 42 whereby the gear 44 and the shaft 43 are operated, the sprocket 51 wil be rotated thereby operating the conveyer 49. It is also obvious that when the shaft 43 is rotated the gear 63 will rotate with it, thereby operating the gear 62, the shaft 61 and the sprocket 66 for operating the sprocket chain 68 and the fingers 69 at the same time the gear 87 on the outer end of the shaft 43, which is in mesh with the beveled gear 88 on the shaft 70 operate said beveled gear 88, and said shaft 70, and thereby operates the cranks 71 and 72 and the fingers 73.

The corn is carried upwardly and dropped down in such a manner that it will lie across the wagon or across the traveling conveyer 17. The driver may stand on a small platform 88 suitably mounted near the front of the wagon, and from the platform 88 control the foot lever 23. After the rear end of the conveyer 11 has been loaded, the foot lever may be released and the platform 17 permitted to move forwardly and downwardly the proper distance. This operation may be repeated until the conveyer is loaded.

For removing the load from the wagon the forward end of the conveyer 11 is raised by means of the crank 16 and the mechanism connected therewith and the traveling conveyer will move downwardly and rearwardly for discharging the load thereon.

The use of springs 37 and 38 make it possible to space the arms 36 well apart and tend to move all the stalks into line as they are cut, even if they are out of line in the row.

It will be understood that numerous changes may be made in the details of the construction of my machine without departing from the essential features of my invention, and it is my intention to cover by this application any such changes which may be included within the scope of the appended claims.

I claim as my invention:

1. In a device of the class described, a frame, a shaft mounted thereon, a traction wheel on said shaft, means for securing said frame to a wagon, gathering arms at the forward end of said frame, a shaft arranged longitudinally in said frame, means for transmitting rotary motion from said first shaft to said second shaft, a conveyer frame pivotally mounted on said second shaft, at its end adjacent to the point of delivery from the receiving arms, means for adjustably securing said conveyer frame in different positions of its tilting movement, a traveling conveyer mounted in said frame, gearing devices interposed between said second shaft and said conveyer for operating said conveyer from said second shaft in all positions of the conveyer, a frame mounted on said conveyer frame and extending above the same, sprocket wheels on said upper frame, a sprocket chain on said sprocket wheels, carrying arms mounted on said chain, and means for operating said chain from said second shaft.

2. In a device of the class described, a frame, a shaft mounted thereon, a traction wheel on said shaft, gathering arms at the forward end of said frame, a shaft arranged longitudinally in said frame, means for transmitting motion from said first shaft to said second shaft, a conveyer frame pivotally mounted on said second shaft at its end adjacent to the point of delivery from the gathering arms, means for adjustably securing said conveyer frame in different positions of its tilting movement, a traveling conveyer mounted in said conveyer frame, gearing devices interposed between said second shaft and said conveyer for operating said conveyer in all positions of the conveyer frame, an upper frame mounted on said conveyer frame, a shaft mounted in the conveyer frame and in the upper frame at the lower ends thereof, a sprocket wheel on said last described shaft, a sprocket wheel on the upper end of the upper frame, a sprocket chain on said sprocket wheels, and gearing devices interposed between the second shaft and the last described shaft for transmitting motion from the second shaft to the last described shaft in all positions of the latter.

Des Moines, Iowa, October 3, 1913.

DAVID R. WAY.

Witnesses:
A. G. HAGUE,
M. WALLACE.

Copies of this patent may be obtained for five cents each, by addressing the "Commissioner of Patents, Washington, D. C."